United States Patent
Korolenko et al.

(12)

(10) Patent No.: US 6,229,761 B1
(45) Date of Patent: May 8, 2001

(54) ESTIMATING SHIP VELOCITY THROUGH THE WATER AND OVER THE GROUND

(75) Inventors: Kyrill V. Korolenko, Portsmouth, RI (US); Henry Ralph D'Amelia, East Lyme; Henry Robert D'Amelia, Mystic, both of CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/405,305

(22) Filed: Sep. 17, 1999

(51) Int. Cl.[7] .............................. G01S 15/00; G01S 15/60
(52) U.S. Cl. .................... 367/91; 367/89; 367/90
(58) Field of Search .................... 367/89, 90, 91

(56) References Cited

U.S. PATENT DOCUMENTS 5,050,133 * 9/1991 Buddery ................................ 367/91

FOREIGN PATENT DOCUMENTS

2232488 * 12/1990 (GB) .............................. G01S/15/60

* cited by examiner

Primary Examiner—Ian J. Lobo
(74) Attorney, Agent, or Firm—Michael J. McGowan; Prithvi C. Lall; Michael F. Oglo

(57) ABSTRACT

A method and system are provided to estimate a ship's velocity. Two ship sonar returns from two different directions are selected. Each return includes volume reverberation data and bottom reverberation data. Doppler shift for each of the two returns based on the volume reverberation data is determined as a basis for estimating ship velocity relative to the water. Doppler shift for each of the two returns based on the bottom reverberation data is determined as a basis for estimating ship velocity relative to the ground.

11 Claims, 1 Drawing Sheet

ESTIMATING SHIP VELOCITY THROUGH THE WATER AND OVER THE GROUND

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to the determination of ship velocity, and more particularly to a method and system for estimating ship velocity through the water (i.e., relative to the water) and over the ground (i.e., relative to the ground).

(2) Description of the Prior Art

In shipboard active sonar systems, the change in received frequency (i.e., Doppler shift) based on relative speed of the ship is a critical issue when trying to differentiate moving targets from background (stationary) sources of reflection or reverberation. The Doppler shift in the echo from a stationary object is a function of the speed of the sonar's transmitter (i.e., ship velocity) through the water in the direction of the object. One device used to measure ship velocity is an electromagnetic velocimeter wherein a pitot tube is used to measure the speed of the ship in water. A change in pressure on the tip of the pitot tube is experienced due to the ship's speed in water which is measured by a corresponding change in its electrical resistance. However, this type of device is operationally unreliable, quickly drifts out of calibration and has a high error factor. Any errors in ship velocity lead to errors in Doppler compensation of the active sonar thereby degrading sonar and fire control performance.

SUMMARY OF THE INVENTION

Accordingly, it is an object of the present invention to provide a method and system for accurately estimating own ship velocity through the water and over the ground.

Other objects and advantages of the present invention will become more obvious hereinafter in the specification and drawings.

In accordance with the present invention, a method and system are provided to estimate a ship's velocity relative to the water and relative to the ground. A sonar system onboard a ship is operated to generate sonar returns. Two returns originating from two different directions are selected. Each return includes volume reverberation data and bottom reverberation data. A Doppler shift in frequency for each of the two returns based on the volume reverberation data is determined as a basis for estimating ship velocity relative to the water. A Doppler shift in frequency for each of the two returns based on the bottom reverberation data is determined as a basis for estimating ship velocity relative to the ground.

BRIEF DESCRIPTION OF THE DRAWINGS

Other objects, features and advantages of the present invention will become apparent upon reference to the following description of the preferred embodiment and to the drawings, wherein corresponding reference characters indicate corresponding parts throughout the several views of the drawings and wherein.

DESCRIPTION OF THE PREFERRED EMBODIMENT

An active sonar reverberation field can be divided into three components based on the source of reverberation. That is, an active sonar reverberation field typically has a surface reverberation component, a bottom reverberation component and a volume reverberation component. In terms of the present invention, it is the volume and bottom reverberation components which are of interest.

Figure 1:
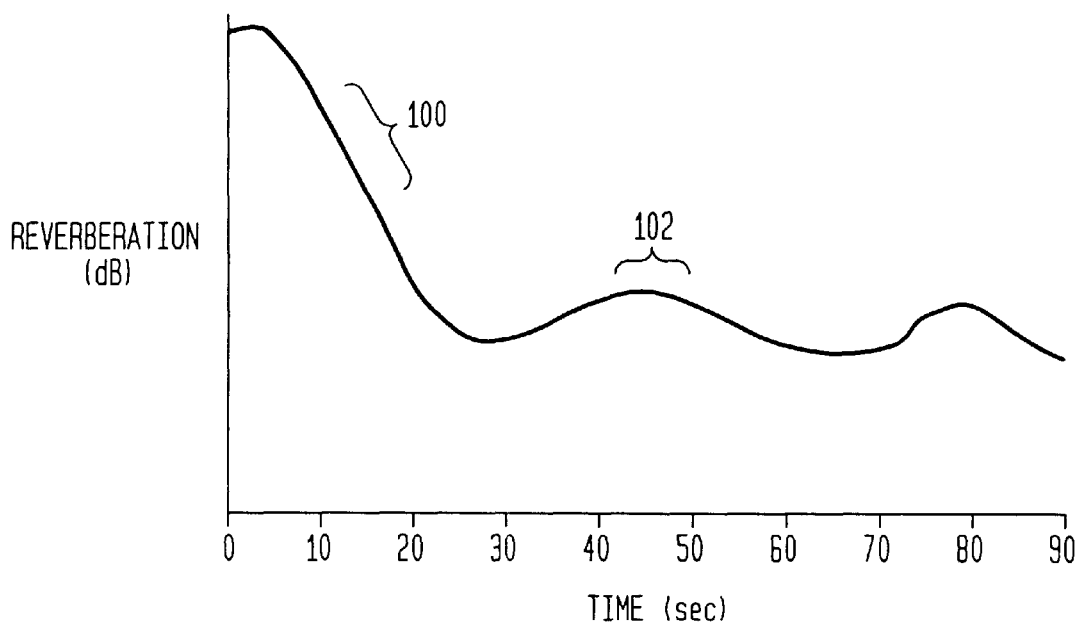
FIG. 1 is a typical plot of relative reverberation level versus time for a sonar return.

FIG. 1 depicts a typical plot of reverberation level versus time for a sonar return where a volume reverberation component is indicated at 100 and a bottom reverberation component is indicated at 102. Note that even though the plot is depicted as a smooth curve, in reality it is quite variable with a theoretical standard deviation of amplitude to mean amplitude of 0.52 based on at-sea measurements. The volume reverberation model assumes scatterers of equal scattering strength uniformly distributed throughout a water column. When considering volume reverberation, the incremental volume as defined by the transmitted pulse length and the two-dimensional transmit/receive pattern increases with range R. Accordingly, the received volume reverberation component of a sonar return falls off as a function of 1/R and therefore occurs shortly after the trailing edge of the transmit pulse. The bottom reverberation model also assumes scatterers of equal scattering strength but uniformly distributed over the sea bottom. Bottom reverberation generally varies as the square of the sine of the incident angle of the transmitted pulse.

Figure 2:
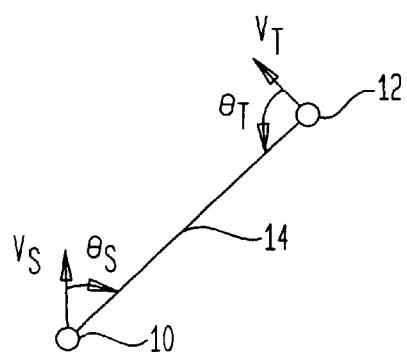
FIG. 2 is a schematic view depicting the angular relationships used in determining the Doppler shift caused by a moving target in a sonar return received by a moving ship.

The present invention is a method and system that estimates ship velocity by processing returns from a moving target. The Doppler shift $\Delta f$ for the condition where both the ship and target have a velocity can be defined as $$\Delta f = \frac{2f_0}{c}(V_S \cos\theta_S - V_T \cos\theta_T) \quad (1)$$

where $f_0$ is the sonar's transmit frequency, c is the velocity of sound in water in feet per second, $V_S$ is the velocity of the ship (i.e., the sonar source) in feet per second, $V_T$ is the velocity of the target in feet per second, and $\theta_S$ and $\theta_T$ are the ship and target angles, respectively, between the direction of the respective velocities and a radius vector from the ship to the target. These relationships are illustrated in FIG. 2 where a ship moving at velocity $V_S$ is indicated by reference numeral 10 and a target moving at velocity $V_T$ is indicated by reference numeral 12. The radius vector from ship 10 to target 12 is indicated at 14.

Considering the cause of reverberation to be a series of scatterers (i.e., targets) distributed throughout a volume or over the bottom surface with zero velocity, equation (1) can be reduced to $$\Delta f = \frac{2f_0}{c} V_S \cos\theta \quad (2)$$

θ can be interpreted as the direction of acoustic transmission relative to the ship's heading or the direction of ship motion through the water. Solving equation (2) for $V_S$ yields $$V_S = \frac{c\Delta f}{2f_0 \cos\theta} \quad (3)$$

Volume reverberation scatterers are assumed to be of equal scattering strength and uniform distribution as described above. If zero (scatterer) velocity is postulated, then the Doppler shift Δf determined from the volume reverberation component is proportional to ship velocity $V_s$ once corrected for angle θ relative to the direction of motion through the water. For volume scatterers, current gradients could create an apparent velocity, but in this analysis the current gradients are assumed to be zero for two reasons. First, in typical open ocean areas, the current velocity is locally constant. That is, within a short distance of the ship, the water is moving as a homogenous mass. Second, it is impossible to know the current gradients from onboard the ship, so any gradient effects essentially represent uncorrectable error.

Although heading is indicated by the ship's compass, wind and wave action can cause the direction of motion relative to the water mass to differ from the compass reading. To determine the actual motion vector relative to the water mass, two transmission directions $\theta_1$ and $\theta_2$ are chosen and the respective Doppler shifts in each direction are measured. The speed component in each i-th transmission direction is $$V_i = \frac{c\Delta f_i}{2f_0} \quad (4)$$

Note that the cosθ term in each direction is equal to 1 since θ is zero for each transmission direction.

If $\theta_1$ and $\theta_2$ are chosen to be orthogonal to one another, the velocity of the ship in its direction of motion through the water (i.e., relative to the water mass) or $V_w$ is $$V_W = \sqrt{V_1^2 + V_2^2} \quad (5)$$

Substituting equation (4) into equation (5) yields $$V_W = c\frac{\sqrt{(\Delta f_1^2 + \Delta f_2^2)}}{2f_0} \quad (6)$$

for the situation where $\theta_1$ and $\theta_2$ are orthogonal. For estimating velocity of the ship through the water or $V_w$, $\Delta f_1$ and $\Delta f_2$ are based on the volume reverberation component of the sonar returns in each of the two directions defined by $\theta_1$ and $\theta_2$. For further convenience, one transmission direction (or $\theta_1$) can correspond to the direction of the ship's compass heading or ship's heading as it will be referred to hereinafter.

For bottom reverberation, the assumption that the bottom scatterers have zero velocity is a good one since these scatterers are physically located on the bottom. Therefore, the Doppler shift determined from the bottom reverberation component is proportional to the ship velocity $V_s$ once corrected for transmission angle θ. Even though for a rough bottom there may be several highlights (i.e., point reflectors) within the area of the bottom ensonified by the main beam, the reflected spectral shift will still be proportional to speed in the direction of the transmission or $V_s$. The estimation procedure to find the speed vector over ground $V_G$ is exactly the same as for finding the speed through the water. Accordingly, ship velocity over the ground (i.e., relative to the ground) or $V_G$ is $$V_G = c\frac{\sqrt{(\Delta f_3^2 + \Delta f_4^2)}}{2f_0} \quad (7)$$

where $\Delta f_3$ and $\Delta f_4$ are based on the bottom reverberation component of the sonar returns in each of the two directions defined by $\theta_1$ and $\theta_2$, respectively.

Figure 3:
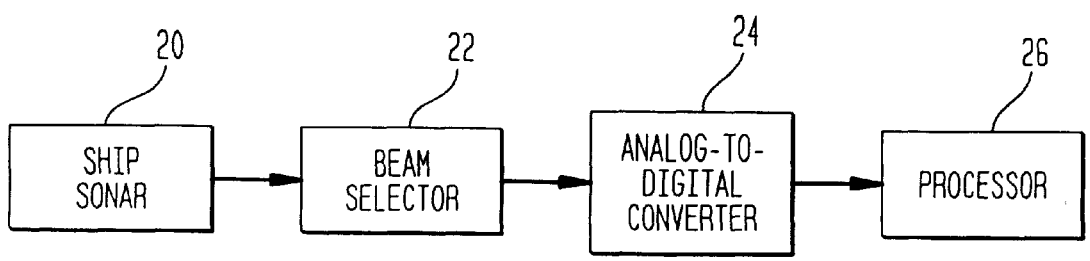
FIG. 3 is a functional block diagram of a system used to carry out the method of the present invention.

A system for carrying out the method of the present invention is illustrated in FIG. 3. A ship sonar 20 transmits sonar pings and receives sonar returns over a range of angles as is known in the art. For convenience, it is assumed that the sonar transmissions/returns occur in the direction of the ship's heading as well as an angle that is orthogonal to the ship's heading. The sonar returns are input to a beam selector 22 which selects two angularly spaced returns which can be two orthogonally related returns. Beam selector 22 can be implemented by a multichannel switch programmed to pass only the returns of interest. The selected beams are digitized at an analog-to-digital converter 24 in order to convert the selected beams into respective time series data. The time series data is passed to a processor 26 programmed to select the volume and bottom reverberation components thereof. As mentioned above, this data can be highly variable and may therefore have to be smoothed prior to spectral analysis for estimating the spectral peak thereof. A variety of smoothing methods could be used. For example, pulse-to-pulse averaging could be used in which spectral averages from ping-to-ping are taken. The spectral peak could also be estimated by a weighted average of each frequency bin. Still further, replica correlation can be used in which the measured spectra is correlated with a stored replica or experimentally-derived waveform. With the spectral peaks determined for both the volume and bottom reverberation components in each of two transmission/reception directions, the appropriate Doppler shifts can be estimated so that velocity of the ship $V_w$ through the water and $V_G$ over the ground can be estimated using equations (6) and (7), respectively.

The advantages of the present invention are numerous. Ship velocity through the water and over the ground are estimated in a simple and straightforward fashion using a ship's sonar. Accordingly, the present invention can be implemented using existing ship sonar systems. Accuracy verification tests indicated that estimated velocities are generally within 0.5 knots.

Although the present invention has been described relative to specific embodiments, it is not so limited. For example, as mentioned above, the use of any angularly-spaced return beam pair could be used to determine ship velocity although estimation error is minimized by using orthogonally-spaced returns. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of estimating a ship's velocity relative to the water and relative to the ground, comprising the steps of:

providing a sonar system onboard a ship;

operating said sonar system to generate sonar returns;

selecting two returns from said sonar returns, said two returns originating from two different directions separated by an angle, each of said two returns including volume reverberation data and bottom reverberation data;

selecting said volume reverberation data and said bottom reverberation data from each of said two returns;

determining a Doppler shift in frequency for each of said two returns based on said volume reverberation data as a basis for estimating ship velocity relative to the water; and determining a Doppler shift in frequency for each of said two returns based on said bottom reverberation data as a basis for estimating ship velocity relative to the ground.

2. A method according to claim 1 wherein said angle is 90°.

3. A method according to claim 1 wherein one of said two different directions is the heading of the ship.

4. A method according to claim 3 wherein said angle is 90°.

5. A method according to claim 1 wherein each said step of determining comprises the steps of:

adding said Doppler shift in frequency for each of said two returns to form a sum;

taking a square root of said sum; and multiplying said square root by $(c/2f_0)$ where c is equal to the speed of sound in water and $f_0$ is a transmitting frequency of said sonar system.

6. A method of estimating a ship's velocity relative to the water and relative to the ground, comprising the steps of:

providing a sonar system onboard a ship;

operating said sonar system at a transmitting frequency of $f_0$ to generate sonar returns as a function of time, each of said sonar returns having a volume reverberation spectral component and a bottom reverberation spectral component;

selecting a first return and a second return from said sonar returns, said first return aligned along the heading of said ship and said second return angularly spaced from said first return;

determining a first Doppler frequency shift $\Delta f_1$ using said volume reverberation spectral component of said first return;

determining a second Doppler frequency $\Delta f_2$ using said volume reverberation spectral component of said second return;

determining a third Doppler frequency shift $\Delta f_3$ using said bottom reverberation spectral component of said first return; and determining a fourth Doppler frequency shift $\Delta f_4$ using said bottom reverberation spectral component of said second return, wherein an estimate of velocity $V_W$ of said ship relative to the water is $$V_W = c \frac{\sqrt{(\Delta f_1^2 + \Delta f_2^2)}}{2f_0}$$

and wherein an estimate of velocity $V_G$ of said ship relative to the ground is $$V_G = c \frac{\sqrt{(\Delta f_3^2 + \Delta f_4^2)}}{2f_0}.$$

7. A method according to claim 6 wherein said second return is angularly spaced from said first return by 90°.

8. A method according to claim 6 wherein, prior to said steps of determining, said method further comprises the steps of:

digitizing said first return and said second return to form a first time series and a second time series, respectively;

selecting portions of said first time series and said second time series containing data used in generating each said volume reverberation spectral component and each said bottom reverberation spectral component;

statistically smoothing each of said portions; and performing a spectral analysis on each of said portions so smoothed to generate said volume reverberation spectral component and said bottom reverberation spectral component associated with each of said first return and said second return.

9. A system for estimating a ship's velocity relative to the water and relative to the ground, comprising:

a sonar system mounted onboard a ship for generating sonar returns over a range of angles relative to said ship;

a beam selector coupled to said sonar system for selecting two returns from said sonar returns, said two returns originating from two different directions separated by an angle, each of said two returns including volume reverberation data and bottom reverberation data; and a processor coupled to said beam selector for selecting space said volume reverberation data and said bottom reverberation data from each of said two returns and for determining a Doppler shift in frequency for each of said two returns based on said volume reverberation data as a basis for estimating ship velocity relative to the water, and determining a Doppler shift in frequency for each of said two returns based on said bottom reverberation data as a basis for estimating ship velocity relative to the ground.

10. A system as in claim 9 wherein said beam selector is a multichannel switch.

11. A system as in claim 9 further comprising an analog-to-digital converter coupled between said beam selector and said processor for digitizing each of said two returns provided to said processor.

* * * * *